United States Patent
Szolyga et al.

(10) Patent No.: US 8,408,744 B2
(45) Date of Patent: Apr. 2, 2013

(54) RGB LED CONTROL USING VECTOR CALIBRATION

(75) Inventors: Thomas H Szolyga, Saratoga, CA (US); Luca Di Fiore, Taiwan (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 303 days.

(21) Appl. No.: 12/935,582

(22) PCT Filed: Mar. 31, 2008

(86) PCT No.: PCT/US2008/058855
§ 371 (c)(1),
(2), (4) Date: Sep. 29, 2010

(87) PCT Pub. No.: WO2009/123605
PCT Pub. Date: Oct. 8, 2009

(65) Prior Publication Data
US 2011/0026256 A1    Feb. 3, 2011

(51) Int. Cl.
*F21V 33/00* (2006.01)

(52) U.S. Cl. .......................... 362/253; 362/230; 362/231

(58) Field of Classification Search .................. 362/253, 362/231, 230
See application file for complete search history.

(56) References Cited

U.S. PATENT DOCUMENTS

| | | | |
|---|---|---|---|
| 6,507,159 B2 | 1/2003 | Muthu | |
| 6,630,801 B2 | 10/2003 | Schuurmans | |
| 6,633,301 B1 | 10/2003 | Dallas et al. | |
| 2004/0245946 A1 | 12/2004 | Halter | |
| 2005/0068503 A1* | 3/2005 | Imade | 353/31 |
| 2005/0134202 A1* | 6/2005 | Lim et al. | 315/312 |
| 2005/0272474 A1 | 12/2005 | Blersch | |
| 2006/0045331 A1 | 3/2006 | Chang | |
| 2006/0109137 A1 | 5/2006 | Callahan | |
| 2006/0237636 A1* | 10/2006 | Lyons et al. | 250/228 |

FOREIGN PATENT DOCUMENTS

| | | |
|---|---|---|
| CN | 1726384 | 1/2006 |
| CN | 1938666 | 3/2007 |
| KR | 10-2007-0090448 | 9/2007 |
| WO | WO-2004/053438 | 6/2004 |

* cited by examiner

*Primary Examiner* — Evan Dzierzynski

(57) ABSTRACT

Color matching and coordinated illumination is achieved using RGB LEDs and vector calibration.

12 Claims, 4 Drawing Sheets

RGB LED CONTROL USING VECTOR CALIBRATION

BACKGROUND OF THE INVENTION

The present invention provides for color matching and coordination of LED-based illumination. The present invention has particular applicability to gaming PCs, in which context LEDs make important aesthetic as well as utilitarian contributions.

Many prior-art computers use LEDs as indicators, e.g., for "power on" or "disk in operation". Use of LEDs has gone beyond utilitarian, e.g., they can be used to illuminate a logo for brand-name recognition. Gaming computers, like the Blackbird, available from Hewlett-Packard Company, are often seen as a "statement"; aesthetics are important to that statement, and LEDs are an important part of that aesthetic.

Where aesthetics are a concern, precise colors are required for color matching and coordination. If matching LEDs are required, having one of them slightly off color can ruin an effect. Likewise, if LEDs are supposed to output coordinated colors, the effect can be muted or ruined if one of the LEDs outputs the wrong shade of its color.

However, selecting LEDs that match each other or specific colors is not trivial. Different manufacturers typically use different processes to manufacture LEDs. A given manufacturer may use different processes for LEDs of different specifications, e.g., power output levels. Even LEDs of the same specification and manufactured by the same process can differ from batch to batch. If matched LEDs are required, one approach is to select them from the same batch or bin. However, this selectivity can involve extra costs and is subject to problems when an LED needs to be replaced. Finding Precisely coordinated LED colors can be even more challenging, as this cannot be accomplished by selecting from a common bin. What is needed is a better approach to precise color for LED illuminating for gaming PCs and other contexts.

Herein, related art is described to facilitate understanding of the invention. Related art labeled "prior art" is admitted prior art; related art not labeled "prior art" is not admitted prior art.

BRIEF DESCRIPTION OF THE DRAWINGS

The figures depict implementations/embodiments of the invention and not the invention itself.

DETAILED DESCRIPTION

Figure 1:
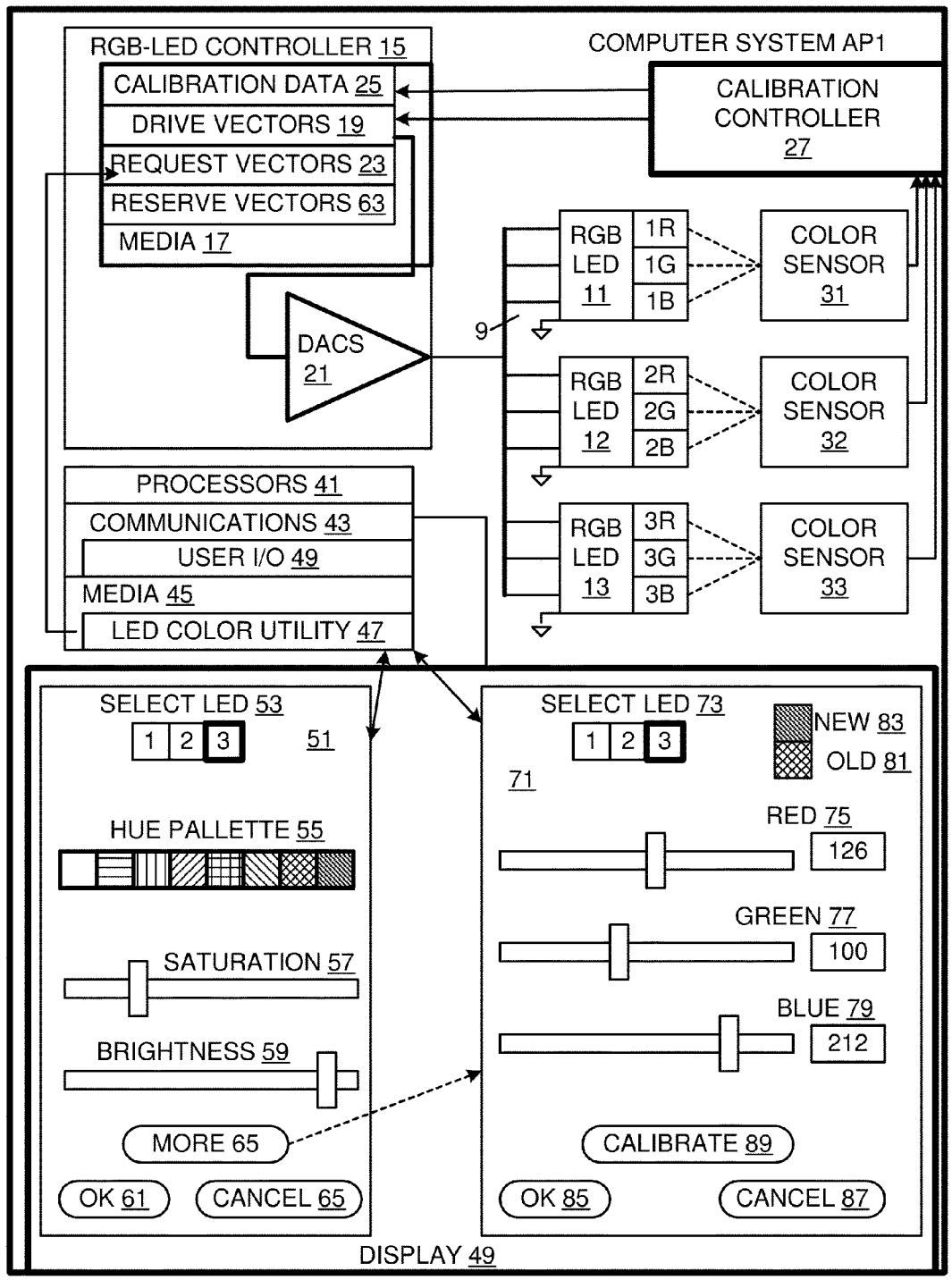
FIG. 1 is a schematic illustration of a computer system employing RGB LEDs in accordance with an embodiment of the invention.

The present invention provides for using an RGB controller with (non-scalar) vector calibration to drive RGB LEDs, thus providing a level of color matching that cannot be approached using monochromatic or bi-chromatic LEDs. Herein, an "RGB LED" is any single or multi-element LED that can emit all three of the primary additive colors, red, green, and blue. Through color addition, an RGB LED can output a gamut (range) of colors that approximates the visible spectrum. Vector calibration allows any color output by an RGB LED to be corrected to any other color output by the RGB LED. Thus, even if two RGB LEDs respond differently to voltage inputs, the RGB controller can adjust one or both inputs so that the LED outputs match or coordinate as desired. Thus, even for colors that can be output by monochromatic or bi-color LEDs, more expensive RGB LEDs may be selected to provide for better color matching.

Likewise, vector calibration can be used to improve conformity of the output of an RGB LED to a standard RGB color space, such as sRGB, Adobe RGB, Apple RGB, NTSC, etc. Of course, if the outputs of two RGB LEDs conform to the same standard RGB space, they conform to each other.

Consider, for purposes of comparison and contrast, a computer that uses two monochromatic green LEDs for front-panel illumination. If these LEDs respond with different sensitivities to input voltages, then they will, in general, shine at different intensities if the same voltage is applied to each. Controllers for such LEDs could apply scalar calibrations to compensate for such differences in sensitivity. However, if the green of one of the LEDs is a little yellower than the green of the other, the color mismatch cannot be corrected by adjusting intensities. Likewise, the corresponding problem in RGB LEDs cannot be corrected effectively by applying independent scalar calibrations to respective red, green, and blue elements of the RGB LEDs. However, vector calibration would allow a little blue from a blue element to be used to compensate for the yellow of the green element.

In accordance with an embodiment of the invention, a computer system AP1 includes RGB LEDs 11, 12, and 13. More generally, the invention provides for any number of RGB LEDs; the invention is particularly applicable to systems with two or more RGB LEDs that have different color production functions. In other words, they may respond differently to the same inputs because they are from different manufacturers, were made by different processes, and/or are designed to meet different specifications.

Each RGB LED 11, 12, 13 is an assembly of individual red, green, and blue LED elements: RGB LED 11 includes red LED element 1R, green LED element 1G, and blue LED element 1B; RGB LED 12 includes red LED element 2R, green LED element 2G, and blue LED 2B; RGB LED 13 includes red LED element 3R, green LED element 3G, and blue LED element 3B. Each RGB LED has four leads, one for each color channel (red, green, blue) and one for ground. The voltage at each lead determines the brightness of the associated single-color element and thus its contribution to the overall color output by the incorporating RGB LED 11, 12, or 13.

The voltages used to drive RGB LEDs 11, 12, and 13 are provided by RGB LED controller 15. In the illustrated embodiment, there are nine distinct drive voltages, one for each of three color elements for each of three RGB LEDs. The magnitudes of these nine voltages are determined by three 8+8+8-bit drive vectors 19 stored in computer-readable media 17. Each drive vector is converted to R, G, and B voltage levels by digital-to-analog converters (DACs) 21.

RGB-LED controller 15 computes drive vectors 19 from request vectors 23. Like the drive vectors, each request vector is an ordered set of three 8-bit values. In the case of a request vector, the 8-bit values represent requested intensity values for each of the three R, G, and B color channels. Each request vector corresponds to a predetermined color in a standardized sRGB color space. (Alternative embodiments use other standard RGB color spaces.) RGB LED controller 15 adjusts these request vectors to pre-compensate for deviations in the color production functions of RGB LEDs 11, 12, 13 so that their actual outputs match, as closely as possible, the requested colors represented by request vectors 23.

Calibration data 25 defines one or more vector calibration functions that can take the form of a look-up table for which request vectors are the inputs (addresses) and drive vectors (resulting from calibration adjustments to the request vectors) are the outputs (entries). In practice, a smaller table can represent a sub-sample of the possible request vectors, with interpolation used to compute drive vectors for request values not represented in the table. Alternatively, the calibration data can specify the values for parameters of algorithms used to translate request vectors into drive vectors.

Calibration data 25 can be factory set and user updatable using calibration procedures. In the illustrated embodiment, calibration can be effected using a calibration controller 27 and color sensors 31, 32, and 33 that are built into computer AP1. In alternative embodiments, a single color sensor can be used; this color sensor may be a supplied or a separately purchasable accessory. Using a movable color sensor avoids systematic errors that can arise due to differences in fixed color sensors. The calibration controller can be built into the RGB controller, be a separate component of the computer, or be a supplied or separately purchased accessory. The invention also allows a human eye to serve as the color sensor and trial and error to be used for calibration (e.g., without the need of a calibration controller).

Calibration controller 27 is coupled to RGB LED controller 15 so that it can control drive vectors 19 and thus implement test sequences. For each RGB LED 11, 12, 13, each test-drive vector imposed by calibration controller 27 yields an output color. The respective color sensor 31, 32, 33, senses this output color. Each color sensor 31, 32, 33 outputs an output vector representing the sensed color in sRGB space. (More generally, it is convenient to represent the output color in the standardized color space used for the request vectors.) Calibration controller 27 associates each output vector with the drive vector that produced it; these associations are stored as calibration data 25. Color calibration is a subject that has been extensively explored. The approach described above is just one of many provided for by the present invention.

Computer AP1 includes processor 41, communications devices 43, and computer-readable media 45. Processors 41 are for manipulating data by executing programs of instructions. Media 45 is for storing the data and instructions, including a color utility 47. Media 45 can include solid-state and disk-based memory and storage devices, including media 17, which can be flash memory. Communications devices 43 include input/output devices including a touch-screen display 49, as well as a mouse and a keyboard. In addition, communications devices 43 can include network ports and external bus (USB, firewire, eSATA) interfaces.

LED color utility 47, when launched, provides control panels through which a user can interact to control RGB LEDs 11-13. The first panel to be displayed is HSB panel 51. Panel 51 provides a set of three select LED buttons 53 for selecting one, two, or three of RGB LEDs 11-13 to be adjusted. Below buttons 53 is a hue palette 55. Hue palette 55 allows a selection of hues; eight selections are shown, but utility 47 can be configured to show different numbers of hues, which can be preset or customized. Below palette 55 are a saturation slider 57 and a brightness slider 59. HSB panel 51 allows a user to select colors using the hue-saturation-brightness HSB color space. Utility 47 converts HSB color vectors to sRGB color vectors, which are written to media 17 as color request vectors 23. Thus, HSB panel 51 provides for controlling RGB LEDs 11-13.

When a desired illumination from one or more RGB LEDs has been achieved, a user can activate "OK" button 61. This causes the request vectors to be copied as reserve vectors 63. Instead, a user can restore the previous reserve values as request values by activating "cancel" button 65. A third option is to activate "more" button 67, which brings up RGB panel 71.

RGB panel 71 allows a user to work directly in the sRGB or other standardized RGB space implemented by controller 15. RGB panel 71 has select LED buttons 73, which are comparable to buttons 53 of HSB panel 51. Panel 71 also has combination fields and sliders 75, 77, and 79 for each of the three RGB color channels, red, green, and blue. The numbers in the fields can be typed in or set by moving the sliders. These numbers represent sRGB values from 0-255. Panel 71 also includes color fields 81 and 83 to contrast the old color (established at the last "OK" and stored as a reserve vector 63) and the new color, represented in the RGB fields of panel 71 and tracked by request vectors 23, as well as RGB LEDs 11-13.

Pressing "OK" button 85 overwrites reserve vectors 63 with request vectors 23 for the selected one or more RGB LEDs. Pressing "cancel" button 87 restores the current reserve vectors to request vectors 23. Pressing the "calibrate" button 89 brings up a calibration panel (not shown). The calibration panel gives the user a choice of manual calibration, auto-calibration, and calibration pre-set uploading. Manual calibration allows a user to edit the calibration data based on trial-and-error procedures in which the user sets request vectors and observes the resulting output colors. Auto-calibration involves the calibration controller 27 setting calibration data 24 using a test sequence as described above.

In addition to providing for manual and automatic calibration, utility 47 can upload pre-set vector calibration functions to controller 15. For example, a part identification number for an RGB LED can be submitted over the Internet to a website, which can return a corresponding pre-set vector calibration function. The vector calibration function can be downloaded to computer system AP1, e.g., to media 45. Utility 47 can then upload the pre-set vector calibration function to media 17 of controller 15.

Some alternative embodiments do not include means for calibrating an RGB LED controller. In some of these embodiments, calibration is done at the factory and the calibration curves are not updated once the computer has shipped. In other cases, the computer vendor provides downloadable calibration curves. Thus, a user can provide a specification for a replacement RGB LED and get a suitable calibration curve in response. The invention also provides for using an external sensor to measure discrepancies between requested and actual color and making adjustments to the calibration curves through a user interface. Other embodiments automate this process, allowing an application to interact with an external sensor, e.g., via a USB interface, and set calibration curves accordingly.

Figure 2:
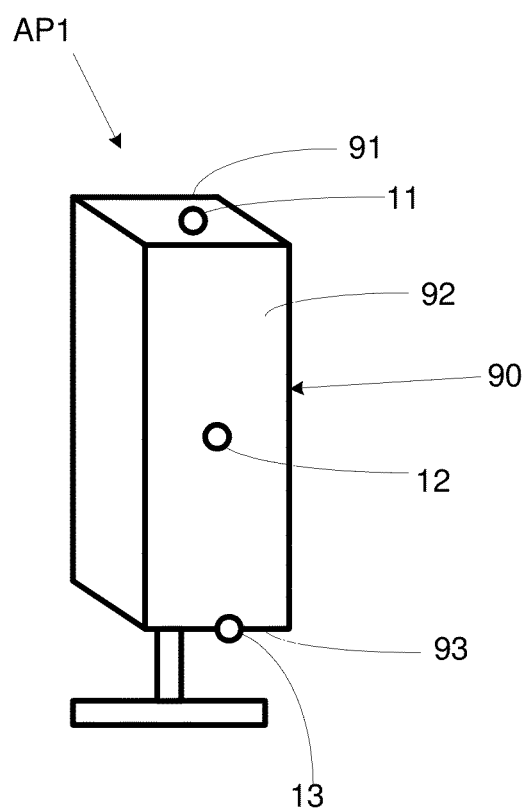
FIG. 2 is a schematic perspective view of the computer system of FIG. 1 showing the location of said RGB LEDs on its housing.

FIG. 2 is a schematic perspective illustration of computer system AP1, showing its housing 90. RGB LED 11 is located on housing top 91, RGB LED 12 is located on front panel 92, and RGB LED 13 is located on the bottom 93 of housing 80. Housing 90 divides a computer interior 95 from a computer exterior 97, as shown schematically in FIG. 1.

Figure 3:
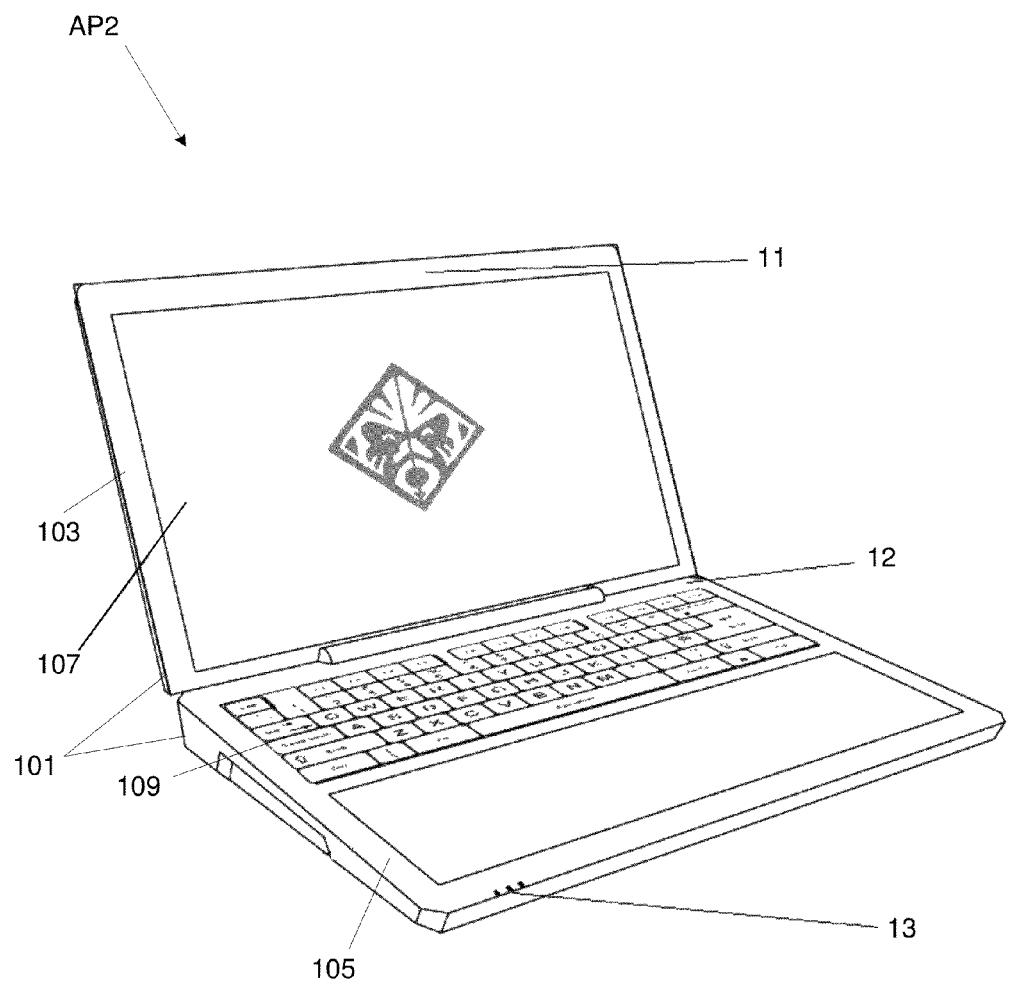
FIG. 3 is a perspective illustration of a laptop computer in accordance with an embodiment of the invention. The LEDs of the laptop correspond to the LEDs of FIG. 1 and so are given the same reference numbers.

FIG. 3 is a perspective of a laptop AP2 in accordance with an embodiment of the invention, having a foldable housing 101 that separates a laptop interior from a laptop exterior. Foldable housing 101 is divided into a display housing 103 and a keyboard housing 105. FIG. 1 is illustrative of the functionality of laptop AP2 as well as of desktop AP1. LED 11 is located at the top center of display housing 103 above a display screen 107; LED 12 is located at the rear right of keyboard housing 105, behind a keyboard 109; and LED 13 is located at the front left of keyboard housing 105.

Additional RGB LEDs can be used in laptop AP2, for example, to provide backlighting for keyboard 109 and illumination for logos (not shown) on the backside of display housing 103. With the calibration system illustrated in FIG. 1, it is possible to color match and coordinate illumination elements of laptop AP2, and even color match and coordinate between computers, e.g., desktop AP1 and laptop AP2.

Figure 4:
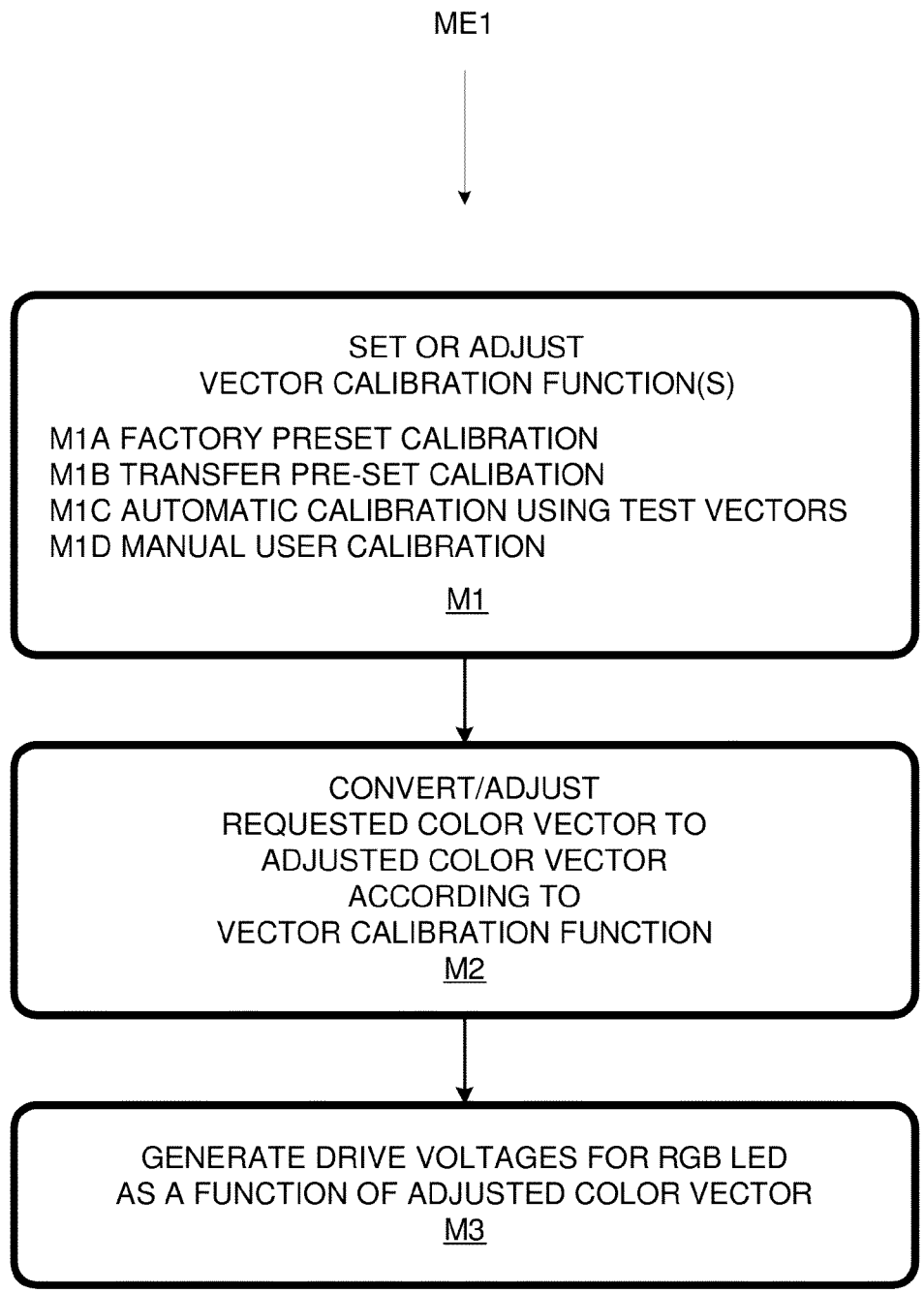
FIG. 4 is a flow chart of a method practiced using the system of FIG. 1 in accordance with a method embodiment of the invention.

The invention provides for a method ME1 as flow charted in FIG. 4. At method segment M1, one or more vector calibration functions are set or adjusted, e.g., using color utility 47 or another program running on a computer being illuminated by the RGB LED(s). "Setting" can involve a factory setting M1A. Also, "setting" can involve transferring a preset vector calibration function M1B. This transfer can involve downloading a pre-set vector calibration function over the Internet (e.g., from a vendor website or support forum) to a computer being illuminated by the RGB LED(s) and then uploading it to an RGB LED controller of the computer. "Setting" can also be the result of automatic calibration M1C using test color vectors to drive RGB LEDs. "Adjusting" can involve a user making manual adjustments M1D. Also, "adjusting" can result using a calibration routine that sets color request vectors, which are then adjusted. The calibration function is then adjusted to minimize "color errors" in the RGB LED outputs.

During automatic calibration, each test vector results in an output color. Each output color is associated with the test vector that produced the output color. The calibration function is determined as a function of these associations.

Once calibration is complete, the vector calibration function can be used to convert or adjust a requested-color vector to an adjusted color vector at method segment M2. The purpose of the adjustment is to pre-compensate for any lack of conformity of the color production function of an RGB LED to some standard RGB color space. Voltages for driving an RGB LED are generated as a function of the adjusted (or drive) color vectors at method segment M3, e.g., using digital-to-analog converters.

As mentioned earlier, calibration can be done in a variety of ways. It can be done using built-in sensors that are paired with respective RGB LEDs. Otherwise, a single movable sensor can be used. The calibration controller can be software or hardware. The calibration can also be done without a sensor. For example, a user can download pre-determined calibration functions. In this case, a vendor or other users can determine calibration functions for particular models of RGB LEDs. A user can identify the models of RGB LEDs in use and download to the computer and upload to the RGB controller the appropriate calibration functions. Also, a color utility can provide for manual adjustment, e.g., by just looking at the color output for certain color values such as black (0,0,0), white (255, 255, 255), and others. For example, a user could manually adjust calibration functions to match whites.

Color errors can be measured in a number of ways. One way is to sum over all requested colors the absolute value of the differences between the requested color and the actual output color. Another measure would be a sum of the squares of these differences. To save computing time, the color space can be sub-sampled; in that case, the color-error measure would be sums based on the sub-sampled space. For example, one could sub-sample the color space by considering vectors using only values of the form 16N-1 such as (0,0,0), (0,0,15), (255, 255, 255), (15, 31, 63), etc., and excluding (1,2,3), (0,0,10), etc.

Color-error functions can be generated in different ways. One way is to input desired color values; the resulting color error function can be used to generate a calibration function. Another way is to input desired color values as adjusted according to a current calibration function; in this case, the color-error function is used to adjust the calibration function. The latter approach can be used iteratively to achieve successively more accurate calibration functions.

An effective calibration function should provide for an output color that matches the requested color more closely than would the color output in response to an unadjusted requested color value. In other words, the color error for the adjusted LED inputs should be less than the color error for the unadjusted inputs. Also, the color error associated with a given RGB LED and associated calibration function should be less than the color error for that RGB LED using the calibration function for any other RGB LED on the system.

This can be formalized as follows.

Let E11 be the color-error measure for RGB LED 11 when requested values for RGB LED 11 are used to drive RGB LED 11.

Let E21 be the color-error measure for RGB LED 12 when requested values for RGB LED 12 are used to drive RGB LED 12.

Let E12 be the color-error measure for RGB LED 11 when requested values for RGB 11 as adjusted by the calibration function for RGB LED 11 are used to drive RGB 11.

Let E22 be the color-error measure for RGB LED 12 when requested values for RGB LED 12 as adjusted by the calibration function for RGB LED 12 are used to drive RGB LED 12.

Let E13 be the color-error measure for RGB LED 11 when requested values for RGB LED 11 as adjusted by the calibration function for RGB LED 12 are used to drive RGB LED 11.

Let E23 be the color-error measure for RGB LED 12 when requested values for RGB LED 12 as adjusted by the calibration function for RGB LED 11 are used to drive RGB LED 12.

Then, E12<E11; E22<E21; E12<E13; and E22<E23. Exceptions are possible but, of course, undesirable.

Herein, a "scalar" is a numeric value selected from the set of real numbers. A "vector" is an ordered set of scalars. Loosely used, "vector" and "scalar" are mutually exclusive. However, in more precise usage, a scalar is a one-dimensional vector. Some multidimensional vector functions are reducible to scalar functions. For example, some vector calibration functions for RGB LEDs can be reduced to independent red, green, and blue calibration functions. The invention provides for such calibration functions as well as for vector calibration functions that are irreducible to scalar calibration functions. For example, an adjustment of adding blue to green to attain a purer green output would require a vector calibration function that is irreducible to scalar constituents, at least to R, G, B, scalar constituent calibration functions. In the illustrated embodiment, calibration involves trying to match a color standard. The invention also provides for matching REG LEDs to each other without reference to a standard. In this case, the color error functions are defined between pairs or groups of RGB LEDs rather than between an RGB LED and a standard.

The invention can apply in the context of exterior illumination for a computer, e.g., a gaming PC. In this context, the object to be illuminated and the object for controlling the illumination are the same. There can also be contexts where the object to be illuminated is distinct from the means for controlling color. For example, the invention can provide precise lighting for a vending machine. The vending machine operator can carry a system for interfacing with the vending machine that allows colors to be adjusted. These and other variations upon and modifications to the illustrated embodiments are provided for by the present invention, the scope of which is defined, by the following claims.

What is claimed is:

1. A computer comprising:
   a housing separating a computer interior from a computer exterior;
   a processor in said interior;
   computer-readable media in said interior;
   plural RGB LEDs illuminating at least some of said housing and at least some of said exterior, wherein said RGB LEDs have respective color production functions that differ from each other; and
   an RGB LED controller for controlling said RGB LEDs, said RGB LED controller applying color vector adjustments to requested color values according to one or more calibration functions, the calibration functions configured to yield an adjusted color vector.

2. A computer as recited in claim 1 wherein said one or more calibration functions are vector calibration functions that are irreducible to multiple independent R, G, B scalar calibration functions.

3. A computer as recited in claim 1 further comprising: one or more sensors for sensing colors output by said RGB LEDs; and a calibration controller for comparing requested values with actual output colors of said RGB LEDs and setting said one or more calibration functions accordingly.

4. A method comprising: adjusting a requested color vector according to a vector calibration function to yield an adjusted color vector; and driving an RGB LED using voltages determined as a function of said adjusted color vector.

5. A method as recited in claim 4 wherein said vector calibration function is irreducible to independent scalar calibration functions for red, green, and blue elements of said RGB LED.

6. A method as recited in claim 4 further comprising setting or adjusting said calibration function before adjusting said requested color vector.

7. A method as recited in claim 6 wherein said setting or adjusting said calibration function involves automatic calibration using test color vectors.

8. A method as recited in claim 6 wherein said setting or adjusting is performed by a program running on a computer being illuminated by said RGB LED.

9. A method as recited in claim 6 wherein said vector calibration function is a pre-set calibration function transferred over the Internet.

10. An RGB LED controller comprising:
    media including calibration data for converting a requested color vector to an adjusted color vector according to a vector calibration function; and
    digital-to-analog converters for converting said adjusted color vector to voltages for driving one or more RGB LEDs.

11. An RGB LED controller as recited in claim 10 wherein said vector calibration function is irreducible to independent scalar calibration functions for separate red, green, and blue color channels.

12. An RGB LED controller as recited in claim 10, wherein said media provides for storing plural vector calibration functions for respective RGB LEDs.

* * * * *